US009667577B2

(12) United States Patent
DeLuca et al.

(10) Patent No.: US 9,667,577 B2
(45) Date of Patent: May 30, 2017

(54) CORRELATING CONTACT TYPE WITH APPROPRIATE COMMUNICATIONS TO ELIMINATE INADVERTENT COMMUNICATIONS

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Surf City, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 14/595,467

(22) Filed: Jan. 13, 2015

(65) Prior Publication Data

US 2016/0205052 A1   Jul. 14, 2016

(51) Int. Cl.
G06F 15/16 (2006.01)
H04L 12/58 (2006.01)
(Continued)

(52) U.S. Cl.
CPC .............. *H04L 51/12* (2013.01); *H04L 29/06* (2013.01); *H04L 29/08072* (2013.01); *H04L 51/16* (2013.01)

(58) Field of Classification Search
CPC .. H04L 29/08072; H04L 29/06; H04L 12/585
(Continued)

(56) References Cited

U.S. PATENT DOCUMENTS 7,620,387 B2   11/2009   Rybak
8,542,606 B2    9/2013   Yach et al.
(Continued)

FOREIGN PATENT DOCUMENTS

WO   2013116848 A2   8/2013

OTHER PUBLICATIONS

Zaino, Jennifer, "Contextual Analysis Tool Could Have Helped Pinpoint U.K. Riot Locations," http://semanticweb.com/contextual-analysis-tool-could-have-helped-pinpoint-u-k-riot-locations_b22417, Aug. 18, 2011, pp. 1-3.
(Continued)

*Primary Examiner* — Khanh Dinh
(74) *Attorney, Agent, or Firm* — Brown & Michaels, PC; John R. Pivnichny

(57) ABSTRACT

A method, computer system, and computer program product for preventing a sender from sending an electronic communication to an unintended recipient through a device. Prior to sending an electronic communication to at least one recipient, extracting data from the electronic communication; for each recipient of the electronic communication, searching for and extracting data from previously sent electronic communications between the sender and the recipient, and determining a communication profile associated with the recipient from the data extracted from the previously sent electronic communications; comparing the extracted data of the electronic communication to the determined communication profile of the recipients; and if the extracted data of the electronic communication does not fit the communication profile of at least one recipient; sending, an intercept prompt to the sender regarding a mismatch of at least one of the recipients with the electronic communication.

14 Claims, 5 Drawing Sheets

(51) Int. Cl.
  *H04L 29/06* (2006.01)
  *H04L 29/08* (2006.01)
(58) Field of Classification Search
  USPC ................................. 709/206, 220, 224, 228
  See application file for complete search history.

(56) References Cited

U.S. PATENT DOCUMENTS

| | | | |
|---|---|---|---|
| 8,675,845 | B2 | 3/2014 | Rybak |
| 8,682,988 | B2* | 3/2014 | Du ........................ G06F 15/16 709/201 |
| 9,349,016 | B1* | 5/2016 | Brisebois ................ H04L 63/20 |
| 9,516,478 | B2* | 12/2016 | Beans ..................... H04W 4/12 |
| 2002/0110231 | A1* | 8/2002 | O'Neal ............... H04M 3/5307 379/201.01 |
| 2004/0153456 | A1* | 8/2004 | Charnock ......... G06F 17/30713 |
| 2005/0198125 | A1 | 9/2005 | Macleod Beck et al. |
| 2005/0235048 | A1* | 10/2005 | Costa-Requena . H04L 29/06027 709/219 |
| 2007/0294428 | A1 | 12/2007 | Guy et al. |
| 2009/0157824 | A1 | 6/2009 | Chu |
| 2009/0299830 | A1* | 12/2009 | West ..................... G06Q 10/06 709/230 |
| 2009/0307316 | A1 | 12/2009 | Murphy et al. |
| 2011/0286584 | A1* | 11/2011 | Angel ..................... G10L 15/26 379/88.02 |
| 2011/0287748 | A1* | 11/2011 | Angel ............... H04M 3/42221 455/414.1 |
| 2012/0011192 | A1 | 1/2012 | Meister et al. |
| 2012/0296965 | A1* | 11/2012 | Srivastava ............. G06Q 50/01 709/204 |
| 2013/0191474 | A1 | 7/2013 | Goel et al. |
| 2013/0304827 | A1 | 11/2013 | Bastide et al. |
| 2017/0006112 | A1* | 1/2017 | Tomida |

OTHER PUBLICATIONS

Edge, Abigail, "Managing Multiple Twitter Profiles: What to do if You Post to the Wrong Account," http://abigailedge.co.uk/2012/07/09/managing-multiple-twitter-profiles-what-to-do-if-you-post-to-the-wrong-account, Jul. 9, 2012, pp. 1-4.
U.S. Appl. No. 14/296,983, filed Jun. 5, 2014; Todd Kaplinger.
U.S. Appl. No. 14/608,853, filed Jan. 29, 2015; Todd Kaplinger.
Murayama, Y. et al. "Usability Issues in Security." Security Protocols 2012, LNCS 7622, pp. 161-171, 2012.
"Mobile-Side Configurable Pseudo-Email and Phone-Call Receiving Filter for Alerting Users Intelligently Based on Different Personal Preferences and Email Priority Levels." An IP.com Prior Art Database Technical Disclosure; IP.com No. IPCOM000130466D; Oct. 2005.
"Securing Sensitive Emails and Messages." An IP.com Prior Art Database Technical Disclosure; IP.com No. IPCOM000226589D; Apr. 2013.
"Phone.com Mobile. Connected on the go" http://www.phone.com/features/rnobile_office.php; at least as early as May 2014.

* cited by examiner

CORRELATING CONTACT TYPE WITH APPROPRIATE COMMUNICATIONS TO ELIMINATE INADVERTENT COMMUNICATIONS

BACKGROUND

The present invention relates to electronic communications, and more specifically to correlating contacts with appropriate electronic communications to eliminate inadvertent, inappropriate communications to certain recipients.

Users may have numerous contacts, both personal and professional, for electronic communications, and often times a user has contacts with names that are similar. In sending electronic communications to a contact or group of contacts, a user may inadvertently send a communication that is personal or professional in nature to the wrong contact or recipient.

For example, a user may inadvertently add the wrong contact to an electronic communication through the process in which the user types a letter of the alphabet and the device returns every contact in the user's list that begins with this letter, increasing the chances that the user may inadvertently pick the wrong contact to send the electronic communication to.

For example, a user wishes to send a message to "Aaron" regarding the basketball game. The user has two contacts with the first name "Aaron", "Aaron Aardvark" and "Aaron Aarivinci". "Aaron Aardvark" is a colleague of the user at work and the communication with this contact would be considered professional in nature. "Aaron Aarivinci" is a college friend and the communication with this contact would be considered personal in nature.

The user wants to send a quick message to Aaron Aarivinci to inform him that a basketball game involving their Alma Mater is on tonight and that they should meet up to watch the game at a local restaurant. To send this message, the user types in the letter "a" into their device and picks the choice with the name "Aaron", which in this case is "Aaron Aardvark". The user then sends the message. Unfortunately, the message, which included personal information, was sent to a professional contact.

SUMMARY

According to one embodiment of the present invention, a method of preventing a sender from sending an electronic communication to an unintended recipient through a device is disclosed. The method comprising the steps of: a device accepting an electronic communication from the sender, the communication having at least one recipient. Prior to sending the electronic communication to the at least one recipient: the device extracting data from the electronic communication; the device, for each recipient of the electronic communication, searching for and extracting data from previously sent electronic communications between the sender and the recipient, and determining a communication profile associated with the recipient from the data extracted from the previously sent electronic communications; the device comparing the extracted data of the electronic communication to the determined communication profile of the recipients; and if the extracted data of the electronic communication does not fit the communication profile of at least one recipient; the device sending an intercept prompt to the sender regarding a mismatch of at least one of the recipients with the electronic communication.

According to another embodiment, a computer program product for preventing a sender from sending an electronic communication to an unintended recipient through a device is disclosed with the device comprising a computer comprising at least one processor, one or more memories, one or more computer readable storage media, the computer program product comprising a computer readable storage medium having program instructions embodied therewith. The program instructions executable by the computer to perform a method comprising: accepting, by the computer of the device, an electronic communication from the sender, the communication having at least one recipient; and prior to sending the electronic communication to the at least one recipient: extracting, by the computer of the device, data from the electronic communication; for each recipient of the electronic communication, searching for and extracting data, by the computer of the device, from previously sent electronic communications between the sender and the recipient, and determining a communication profile associated with the recipient from the data extracted from the previously sent electronic communications; comparing, by the device of the computer, the extracted data of the electronic communication to the determined communication profile of the recipients; and if the extracted data of the electronic communication does not fit the communication profile of at least one recipient; sending, by the device of the computer, an intercept prompt to the sender regarding a mismatch of at least one of the recipients with the electronic communication.

According to another embodiment, a computer system for preventing a sender from sending an electronic communication to an unintended recipient through a device, is disclosed, the device comprising a computer comprising at least one processor, one or more memories, one or more computer readable storage media having program instructions. The program instructions executable by the computer to perform the program instructions comprising: accepting, by the computer of the device, an electronic communication from the sender, the communication having at least one recipient; and prior to sending the electronic communication to the at least one recipient: extracting data, by the computer of the device, from the electronic communication; for each recipient of the electronic communication, searching for and extracting data, by the computer of the device, from previously sent electronic communications between the sender and the recipient, and determining a communication profile associated with the recipient from the data extracted from the previously sent electronic communications; comparing, by the computer of the device, the extracted data of the electronic communication to the determined communication profile of the recipients; and if the extracted data of the electronic communication does not fit the communication profile of at least one recipient; sending, by the computer of the device, an intercept prompt to the sender regarding a mismatch of at least one of the recipients with the electronic communication.

DETAILED DESCRIPTION

Figure 1:
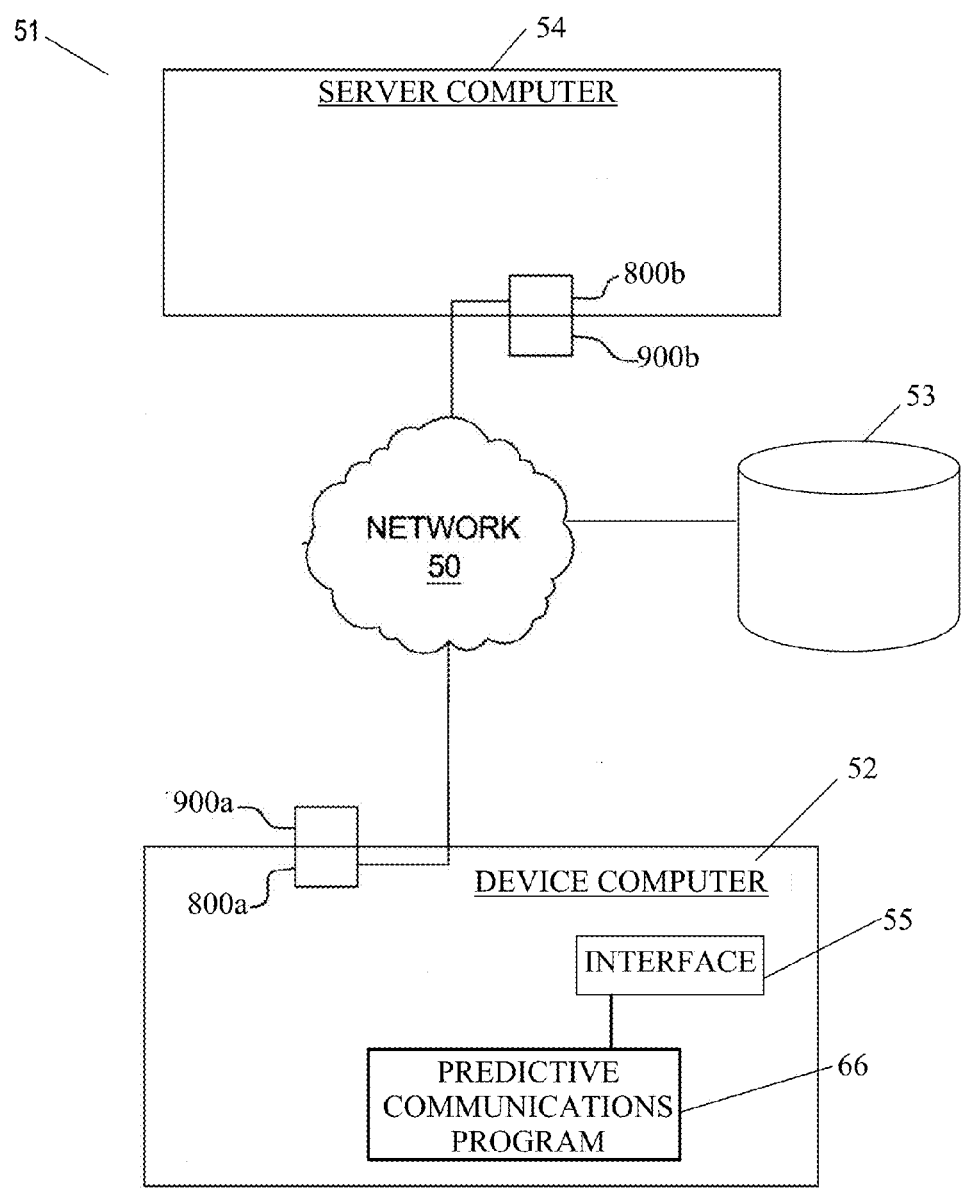
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Figure 5:
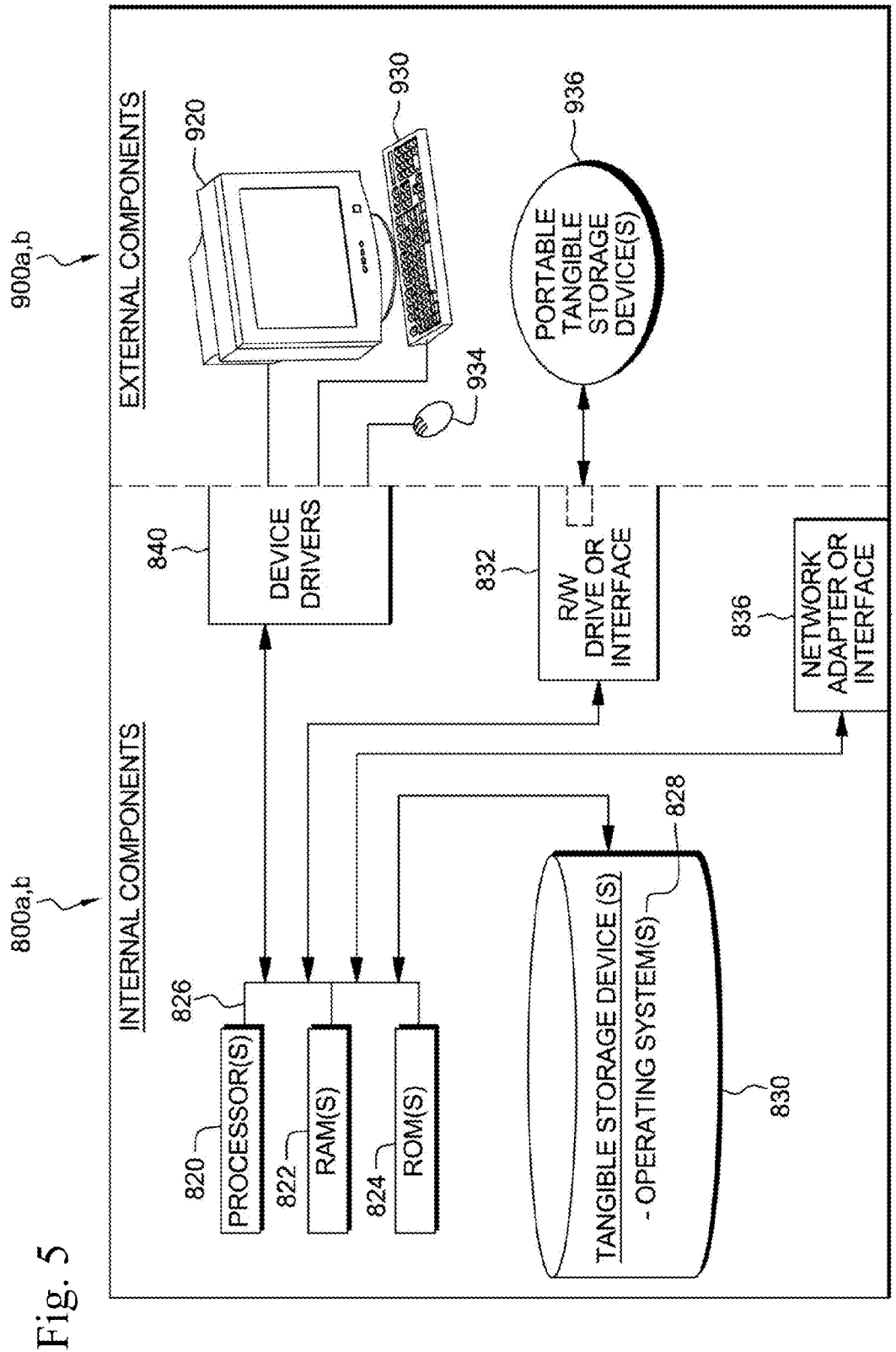
FIG. 5 illustrates internal and external components of a client or device computer and a server computer in which illustrative embodiments may be implemented.

Device computer 52 includes a set of internal components 800a and a set of external components 900a, further illustrated in FIG. 5. Device computer 52 may be, for example, a mobile device, a cell phone, a personal digital assistant, a netbook, a laptop computer, a tablet computer, a desktop computer, or any other type of computing device capable of sending electronic communications to at least one recipient.

Device computer 52 may contain an interface 55. The interface 55 may accept commands and data entry from a user. The interface 55 can be, for example, a command line interface, a graphical user interface (GUI), or a web user interface (WUI). The device computer 52 preferably includes a predictive communications program 66. While not shown, it may be desirable to have the predictive communications program 66 on the server computer 54.

Repository 53 may contain prior or previous electronic communications between a sender and recipients. The prior electronic communications may be searchable, for example by the predictive communication program 66 through an interface on the server computer (not shown) or some other interface. Repository 53 may also contain communication profiles of contacts or recipients of electronic communications from the sender.

Server computer 54 includes a set of internal components 800b and a set of external components 900b illustrated in FIG. 5. The server computer preferably 54 includes or may be an electronic communications server, such as an e-mail server, short message service (SMS) server, instant messaging (IM) server, or any other server which sends an electronic communication to the intended recipients.

In the depicted example, server computer 54 provides information, such as boot files, operating system images, and applications to device computer 52. Server computer 54 can compute the information locally or extract the information from other computers on network 50.

Program code and programs such as a predictive communications program 66 may be stored on at least one of one or more computer-readable tangible storage devices 830 shown in FIG. 5, on at least one of one or more portable computer-readable tangible storage devices 936 as shown in FIG. 5, on repository 53 connected to network 50, or downloaded to a data processing system or other device for use. For example, program code and programs such as predictive communications program 66 may be stored on at least one of one or more tangible storage devices 830 on server computer 54 and downloaded to the device computer 52. Alternatively, server computer 54 can be a web server, and the program code and programs such as a predictive communications program 66 may be stored on at least one of the one or more tangible storage devices 830 on server computer 54 and accessed on the device computer 52. Predictive communications program can be accessed on device computer 52 through interface 55. In other exemplary embodiments, the program code and programs such as a predictive communications program 66 may be stored on at least one of one or more computer-readable tangible storage devices 830 on server computer 54 or distributed between two or more servers.

An electronic communication may be any communication which is sent to a recipient electronically from a sender and may include, but is not limited to an e-mail, an SMS, instant message, tweet, or message within a social media platform.

The term "fit" as used herein is defined as one to one match between data or correlation between data.

In an embodiment of the present invention, predictive analytics are used to recognize when an inappropriate electronic communication is being inadvertently sent by a sender to a contact or recipient, for which the electronic communication is not intended. The level of appropriateness of the electronic communication is determined by using patterns present in previous electronic communications between the sender and the recipient. The patterns may include data regarding the time of day the electronic communications are sent, the day of the week the electronic communications are sent, specific words within an electronic communication, context of the electronic communication, type of electronic communication, attachments to the electronic communications, images associated with the electronic communication or other information.

Based on the pattern of information from past electronic communications between the sender and the recipient, each recipient may be associated with a communication profile. The communication profile may provide a summary of the patterns present. The communication profile may be stored on a repository and updated each time a recipient is added to an electronic communication or the communication profile may be generated each time the sender sends an electronic communication to a recipient.

When an electronic communication is detected that does not match the determined pattern associated with a recipient's communication profile, the sender of the electronic communication receives a prompt through an interface of the device computer prior to the electronic communication being sent to the recipient. Based on the prompt, the sender can choose whether to send the electronic communication to the recipient or not.

Alternatively, when an electronic communication is detected that does not match the determined pattern associated with a recipient's communication profile, a likely recipient may be searched for. The search may be focused on other contacts with similar names to the recipient that the electronic communication was incorrectly addressed to or other information. The prompt to the sender may then include an alternate recipient to replace the inappropriate recipient of the electronic communication.

In another embodiment of the present invention, the sender may also have a communication profile based on previous electronic communications with multiple recipients.

Figure 4:
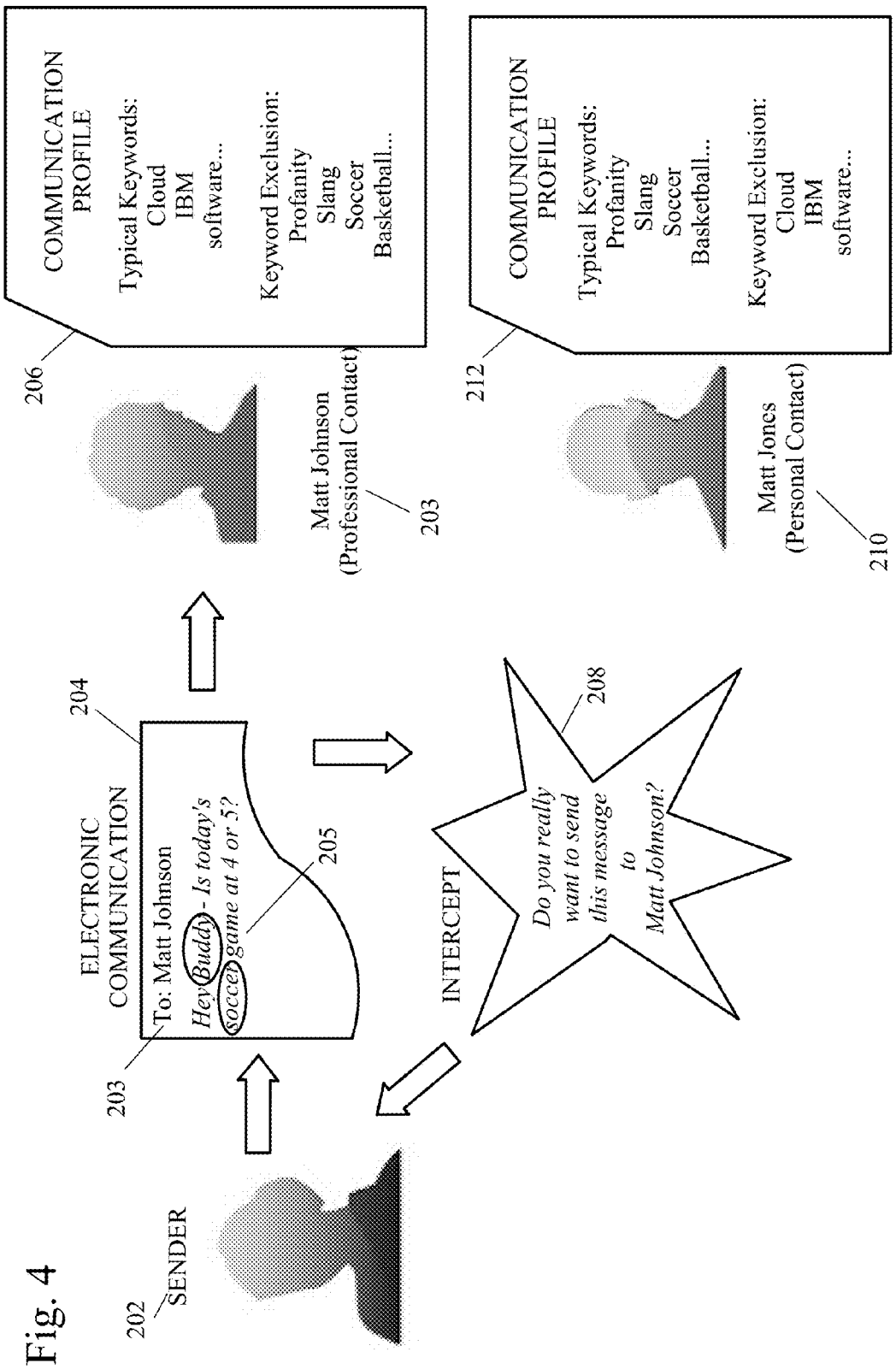
FIG. 4 shows an example of correlating recipients with appropriate communications to eliminate inadvertent communications to recipients.

FIG. 4 shows an example of correlating contact type with appropriate communications to eliminate inadvertent communications to recipients.

A sender 202, through the device computer 52, creates an electronic communication 204 with at least one recipient 203. The electronic communication 204 contains at least one of a text, an image or an attachment. In this case, the text 205 of the electronic communication to the recipient "Matt Johnson" 203 states "Hey Buddy—Is Sunday's soccer game at 4 or 5?"

Prior to the electronic communication being sent to the recipient 203, the predictive communications program 66 extracts keywords from the created electronic communication 204. In this example, the keywords may be "soccer" and "Buddy" which are circled for example purposes only. Other information may also be extracted, for example that the electronic communication is being sent at 6 PM on a Saturday or refers to an appointment outside of business hours (on a Sunday afternoon, in the example).

For each recipient 203 of the electronic communication 204, in this case Matt Johnson, the predictive communications program 66 searches for prior electronic communications that have taken place between the sender 202 and the recipient 203 of the electronic communication. The search may take place in repository 53 or may be some storage device of the device computer 52.

The predictive communications program 66 extracts data from the prior electronic communications it found in its search. The extracted data may include, but is not limited to, the time of day the electronic communications are sent, the day of the week the electronic communications are sent, specific words within an electronic communication, context of the electronic communication, type of electronic communication, attachments to the electronic communications, images associated with the electronic communication or other information. From this extracted data, a communication profile 206 for each recipient may be generated or updated, if a communication profile for the recipient already exists. Alternatively, a communication profile may also be updated or generated for the sender.

For example, as shown in FIG. 4, the communication profile 206 for Matt Johnson includes typical words such as "cloud", "IBM", and "software", and e-mail messages may only be sent to Matt Johnson between the hours of 8 AM and 5 PM on weekdays.

The communication profile may also include a keyword exclusion list. The exclusion list may be generated through the patterns associated with previous electronic communications and the predictive communications program 66 may learn which contacts of the sender are professional and which are personal and apply a set of rules for each. For example, the rule may include exclusion of profanity and slang with professional contacts.

The keywords from the extracted data from the electronic communication 204 are compared to the typical keywords associated with the recipient's communication profile 206. Since the typical keywords of "cloud", "IBM", and "software" do not match the extracted keywords of "soccer" and "Buddy", an intercept prompt 208 is sent to the sender 202 to determine if the sender 208 really wishes to send the electronic communication 204 to the recipient 203 Matt Johnson.

Alternatively, prior to sending the intercept prompt 208 to the sender 202, the predictive communications program 66 can search through the sender's electronic communications for the extracted keywords, other recipients with a similar name and/or other information to determine and recommend a different recipient to the sender 202 for the electronic communication 204.

In the example shown in FIG. 4, based on the keywords, and previously sent electronic communications, the predictive communications program 66 determines that the electronic communication 204 may be intended for an alternate recipient 210, "Matt Jones". The communication profile 212 of Matt Jones shows keywords, such as "soccer" and slang, the time of day the communication is being sent and the day the communication is being sent match the generated electronic communication attempting to be sent.

When the intercept prompt 208 is sent to the sender 202, a suggested recipient 210, in this case "Matt Jones" may be presented to the sender 202 as an alternate recipient 210 for the electronic communication 204.

The sender 202 then determines whether to replace the recipient 203 of the electronic communication 204 with an alternate recipient 210 or send the electronic communication 204 as is to the original recipient 203.

Figure 2:
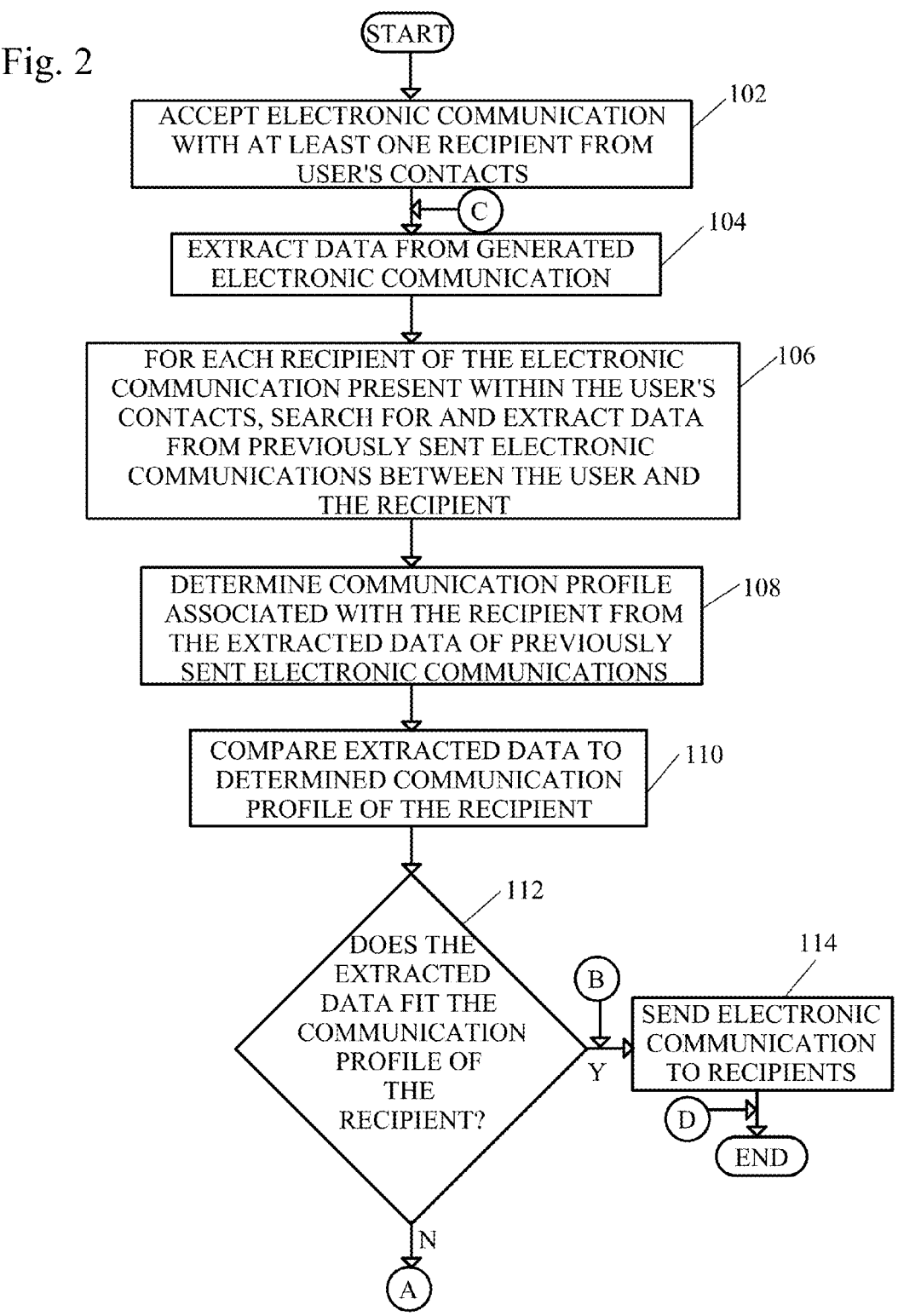
FIGS. 2-3 show a flow diagram of a method of correlating recipients with appropriate communications to eliminate inadvertent communications to recipients.
Figure 3:
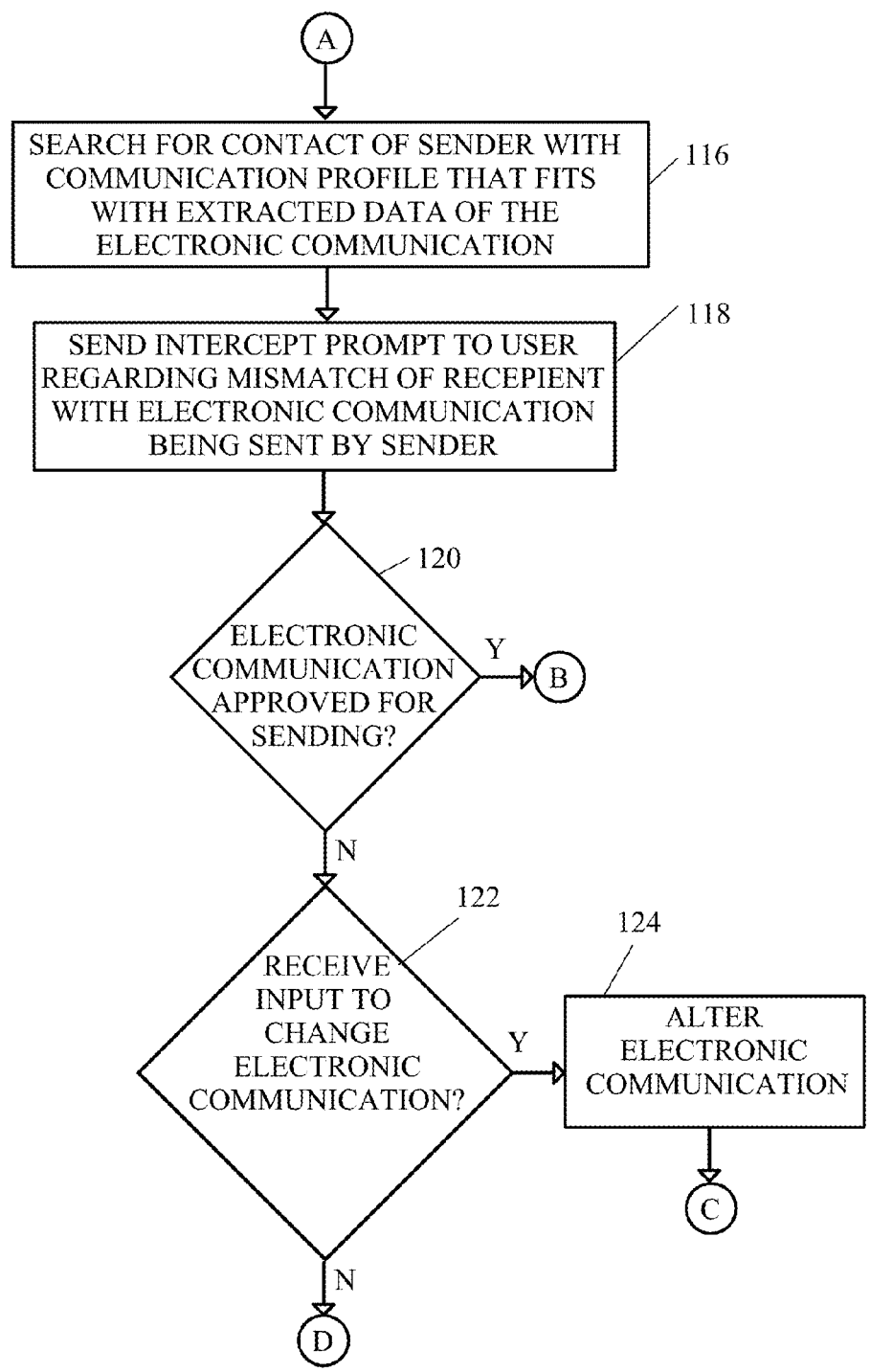

FIG. 2 shows a flow diagram of a method of correlating contact type with appropriate communications to eliminate inadvertent communications to recipients.

In a first step, an electronic communication is generated with at least one recipient from the user's contacts (step 102). Data is extracted from the generated electronic communication (step 104), for example by the predictive communications program 66 through a mining application or other similar program. The extracted data may be keywords oriented to identify slang, social activities, or other wording that can aid in providing context regarding the electronic communication being sent by the sender. The extracted data may also include time of day the electronic communication is being sent, type of electronic message being sent, attachments of the electronic communication, or other information. The extracted data may be stored in a repository, for example repository 53 or a repository of the device computer 52.

For each recipient of the electronic communication, the predictive communication program searches for and extracts data from previously sent electronic communications between the user and the recipient (step 106). The data extracted from the previously sent electronic communications between the user and the recipient may be stored in a repository, for example repository 53 or a repository of the device computer 52.

From the extracted data of the previously sent electronic communications between the user and recipient, a communication profile for the recipient is determined (step 108). The communication profile includes patterns regarding communication between the sender and the recipient, which may include, but is not limited to the time of day the electronic communications are sent, the day of the week the electronic communications are sent, specific words within an electronic communication, context of the electronic communication, type of electronic communication, attachments to the electronic communications, images associated with the electronic communication or other information. The patterns may also be used to infer context of the electronic communications between the sender and the recipient. The communication profile may be stored in a repository, for example repository 53.

The extracted data from the electronic communication to be sent to the recipient are compared to the communication profile associated with the recipient (step 110). For example, the keywords extracted from the electronic communication to be sent may be compared to a keyword exclusion list, keywords most often used with the recipient, or context of the communications most often sent between the sender and the recipient. Other data, such as the time of day the electronic communications are sent, the day of the week the electronic communications are sent, type of electronic communication, attachments to the electronic communications, images associated with the electronic communication may also be compared to the communication profile associated with the recipient.

If the extracted data from the electronic communication matches or fits with the information of the communication profile of the recipient (step 112), the electronic communication is sent to the recipient (step 114) and the method ends.

If the extracted data from the electronic communication does not fit with or match the information or the communication profile of the recipient (step 112), recipients in the sender's contacts are searched for recipients that fit or match the extracted data from the electronic communication (step 116). The recipients that the sender may have intended the electronic communication to be received by may be determined by searching for keywords in the sender's previously electronic communications, communication profiles of recipients which may have been stored, other information other than keywords in sender's previously electronic communications, or recipients with similar names.

A notification or intercept prompt regarding the mismatch of extracted data is sent to the sender (step 118).

If approval to send the electronic communication is received from the sender (step 120), then the electronic communication is sent to the recipient (step 114) and the method ends.

If approval to send the electronic communication is not received from the sender (step 120), and input from the sender changing the electronic communication is received (step 122), the electronic communication is altered according to the input from the sender, and the method returns to step 104.

If approval to send the electronic communication is not received from the user (step 120), and no input from the sender is received (step 122), the method ends.

It should be noted that step 116 is optional and the method may proceed from step 110 to step 118.

While the examples given are in reference to sending an electronic communication between a sender and a recipient who is professional instead of personal, the method may also be applied to a business entity using a device at a client site and preventing inadvertent communication with another client while present at the client site. Therefore, any of the recipients of the electronic communications that are not employed by the business entity of the client site may be considered inappropriate contacts and the sender would receive an intercept prompt for each of the electronic communications they tried to send. Additionally, if an intercept prompt is received for any electronic communications, the electronic communications could be blocked from being sent.

The method may also be applied to auto-response messages if the device owner is unavailable. Depending on the contact trying to communicate with the device owner, different messages are provided, one regarding professional inquiries and one for personal contacts. For example, if an auto-response message is being sent to professional contact, determined based on a communications profile of a recipient, a specific auto-response would be sent.

Additionally, the method may be applied when a parent has lent their device to a child and the parent wants to prevent the child from inadvertently sending electronic communications to the parent's contacts. In such a case, if the child tried to send a message to one of the parent's contacts, the method would bring up an intercept prompt warning of the attempt. In order for the intercept prompt to be bypassed, an additional password may be required.

The method may also be applied to different social media platforms. For example if a sender was using the Twitter social networking site to send a tweet regarding a new article on "cloud computing" written by Joe Baxter, the device may suggest the @mention that starts with the same letter, such as Joe Spanarella. The predictive communications program may determine the context of the tweet through extraction of keywords or rank the order of the suggested @mentions based on the context. If the @mentions communication profile does not include context and/or keywords related to the article, other @mentions may be suggested to the sender.

The method may also be applied to a social media site in which an electronic communication is intended for a large group of users. Electronic communications within social media sites are often posted to homes, timelines, walls, pages, groups or forums and the number of recipients can be large. The predictive communications program 66 may identify an appropriate contact based on the context of the electronic communication.

For example, a sender leaves their social media site displayed on their device while their device is unattended. A user with malicious intent may see the social media site displayed on the unattended device and begin to type profanity. Based on the sender's communication profile, the predictive communications program 66 would be able to determine that the context of the post does not fit with the sender's communication profile and send an intercept prompt requiring an additional password to be entered or some other level of security to be satisfied prior to sending the electronic communication.

FIG. 5 illustrates internal and external components of device computer 52 and server computer 54 in which illustrative embodiments may be implemented. In FIG. 5, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and predictive communications program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Predictive communications program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Predictive communications program 66 can be downloaded to the device computer 52 and server computer 54 from an external computer via a network (for example, the Internet, a local area network or other, wide area network) and network adapter or interface 836. From the network adapter or interface 836, predictive communications program program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Predictive communications program 66 can be written in various programming languages including low-level, high-level, object-oriented or non object-oriented languages. Alternatively, the functions of a predictive communications program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of preventing a sender from sending an electronic communication to an unintended recipient through a device, comprising the steps of:
   a device accepting an electronic communication from the sender, the communication having at least one recipient;
   prior to sending the electronic communication to the at least one recipient:
   the device extracting data from the electronic communication;
   the device, for each recipient of the electronic communication, determining a communication profile associated with the recipient;
   the device comparing the extracted data of the electronic communication to the communication profiles of the recipients; and
   if the extracted data of the electronic communication does not fit the communication profile of at least one recipient
   the device searching previously sent electronic communications between the sender and other recipients with whom the sender has exchanged electronic communications, and
   the device comparing extracted data from the electronic communication to extracted data from the previously sent electronic communications, prior to sending the intercept prompt to the sender;
   the device sending an intercept prompt to the sender regarding a mismatch of at least one of the recipients with the electronic communication and when a match is found between the extracted data from the electronic communication, the intercept further comprises extracted data from the previously sent electronic communications, and a suggested recipient with whom the previously sent electronic communication which had the match was exchanged.

2. The method of claim 1, wherein the data extracted from the electronic communication comprises keywords.

3. The method of claim 1, wherein the data extracted from the electronic communication comprises information regarding a time at which the electronic communication is being sent.

4. The method of claim 1, wherein the data extracted from the electronic communication comprises information regarding documents attached to the electronic communication.

5. The method of claim 1, wherein the data extracted from the electronic communication comprises information regarding excluded categories of content.

6. A computer program product for preventing a sender from sending an electronic communication to an unintended recipient through a device, the device comprising a computer comprising at least one processor, one or more memories, one or more computer readable storage media, the computer program product comprising a computer readable storage medium having program instructions embodied therewith, the program instructions executable by the computer to perform a method comprising:
   accepting, by the computer of the device, an electronic communication from the sender, the communication having at least one recipient;
   prior to sending the electronic communication to the at least one recipient:
   extracting, by the computer of the device, data from the electronic communication;
   for each recipient of the electronic communication, determining a communication profile associated with the recipient;
   comparing, by the device of the computer, the extracted data of the electronic communication to the communication profile of the recipients; and
   if the extracted data of the electronic communication does not fit the communication profile of at least one recipient
   searching, by the device of the computer, previously sent electronic communications between the sender and other recipients with whom the sender has exchanged electronic communications, and
   comparing, by the device of the computer, extracted data from the electronic communication to extracted data from the previously sent electronic communications, prior to sending the intercept prompt to the sender;
   sending, by the device of the computer, an intercept prompt to the sender regarding a mismatch of at least one of the recipients with the electronic communication, and when a match is found between the extracted data from the electronic communication, the intercept further comprises extracted data from previously sent electronic communications, and a suggested recipient with whom the previously sent electronic communication which had the match was exchanged.

7. The computer program product of claim 6, wherein the data extracted from the electronic communication comprises keywords.

8. The computer program product of claim 6, wherein the data extracted from the electronic communication comprises information regarding a time at which the electronic communication is being sent.

9. The computer program product of claim 6, wherein the data extracted from the electronic communication comprises information regarding documents attached to the electronic communication.

10. The computer program product of claim 6, wherein the data extracted from the electronic communication comprises information regarding excluded categories of content.

11. A computer system for preventing a sender from sending an electronic communication to an unintended recipient through a device, the device comprising a computer comprising at least one processor, one or more memories, one or more non-transitory computer readable storage media having program instructions executable by the computer to perform the program instructions comprising:
   accepting, by the computer of the device, an electronic communication from the sender, the communication having at least one recipient;
   prior to sending the electronic communication to the at least one recipient:
   extracting data, by the computer of the device, from the electronic communication;
   for each recipient of the electronic communication, determining a communication profile associated with the recipient;
   comparing, by the computer of the device, the extracted data of the electronic communication to the determined communication profile of the recipients; and
   if the extracted data of the electronic communication does not fit the communication profile of at least one recipient
   the device searching previously sent electronic communications between the sender and other recipients with whom the sender has exchanged electronic communications, and
   the device comparing extracted data from the electronic communication to extracted data from the previously sent electronic communications, prior to sending the intercept prompt to the sender;
   the device sending an intercept prompt to the sender regarding a mismatch of at least one of the recipients with the electronic communication and when a match is found between the extracted data from the electronic communication, the intercept further comprises extracted data from the previously sent electronic communications, and a suggested recipient with whom the previously sent electronic communication which had the match was exchanged.

12. The computer system of claim 11, wherein the data extracted from the electronic communication comprises keywords.

13. The computer system of claim 11, wherein the data extracted from the electronic communication comprises information regarding a time at which the electronic communication is being sent.

14. The computer system of claim 11, wherein the data extracted from the electronic communication comprises information regarding excluded categories of content.

* * * * *